(12) United States Patent
Connor et al.

(10) Patent No.: US 7,598,968 B2
(45) Date of Patent: Oct. 6, 2009

(54) NETWORK PART GRIPS

(75) Inventors: Edward J. Connor, Manchester, NH (US); Craig Storms, Concord, NH (US); Anandaraja Devan, Manchester, NH (US); Patrick Haessly, Virginia Beach, VA (US); Scott Kent, Melbourne, FL (US); Michael C. Rogerson, Manchester, NH (US); Kenneth W. Spalding, III, Mount Vernon, NH (US)

(73) Assignee: Autodesk, Inc., San Rafael, CA (US)

( * ) Notice: Subject to any disclaimer, the term of this patent is extended or adjusted under 35 U.S.C. 154(b) by 346 days.

(21) Appl. No.: 11/390,018

(22) Filed: Mar. 27, 2006

(65) Prior Publication Data

US 2007/0271507 A1 Nov. 22, 2007

(51) Int. Cl.
*G09G 5/00* (2006.01)
(52) U.S. Cl. ........................... 345/661; 715/964
(58) Field of Classification Search ................ 345/650, 345/661, 676
See application file for complete search history.

(56) References Cited

U.S. PATENT DOCUMENTS

| | | | | |
|---|---|---|---|---|
| 4,849,911 A | * | 7/1989 | Campian | 345/441 |
| 5,719,595 A | * | 2/1998 | Hoddie et al. | 345/611 |
| 6,037,939 A | * | 3/2000 | Kashiwagi et al. | 715/798 |
| 6,781,597 B1 | * | 8/2004 | Vrobel et al. | 345/619 |
| 6,801,198 B2 | * | 10/2004 | Ishii et al. | 345/419 |
| 2003/0156126 A1 | * | 8/2003 | Tsuji | 345/660 |
| 2005/0030279 A1 | * | 2/2005 | Fu | 345/156 |
| 2006/0052689 A1 | * | 3/2006 | Scouten et al. | 600/417 |

* cited by examiner

*Primary Examiner*—Kee M Tung
*Assistant Examiner*—David H Chu
(74) *Attorney, Agent, or Firm*—Patterson & Sheridan, L.L.P.

(57) ABSTRACT

Embodiments of the invention provide methods, apparatus, and articles of manufacture for editing network parts present a computer-aided design (CAD) model of a utility network using grips. The network parts may represent elements present in a real-world utility network. Among others, the grips may include a part size grip and a structure rotation grip. When a user selects a part size grip, a graphical user interface may display hash marks to indicate a variety of sizes of the network part provided by a network parts catalog. Dragging the resize grip may cause it to jump from one hash mark to the next, allowing the user to easily select one of the available part sizes. A structure rotation grip may be used to rotate a network part representing a utility network structure about an asymmetric axis.

26 Claims, 9 Drawing Sheets

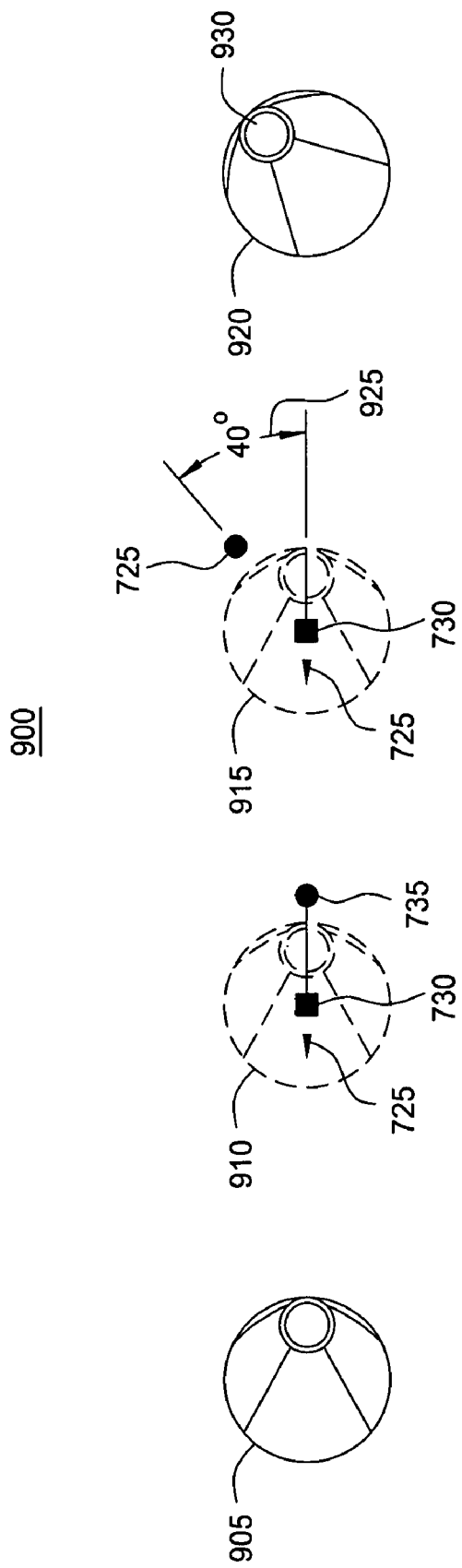

NETWORK PART GRIPS

BACKGROUND OF THE INVENTION

1. Field of the Invention

The present invention generally relates to computer software. More specifically, the present invention relates to computer aided design (CAD) software applications used to create and edit elements of a utility network represented in a CAD model.

2. Description of the Related Art

Currently, computer aided design (CAD) applications allow a designer or engineer to compose graphical representations of utility networks. For example, a user interacting with a CAD application may generate a model of a utility network by drawing simple 2D objects to represent components such as pipes, conduits, manhole covers, etc. Common 2D drawing objects include simple lines and arcs, etc., which provide only a crude representation of the network parts and do not adequately portray the real-world parts. To modify the utility network represented by the 2D drawing objects, the designer or engineer may have to edit one or more of these lines and arcs individually. To indicate connectivity, the user positions these 2D drawing objects relative to one another. If a part was moved that used to be positioned next to other parts to indicate connectivity, those other parts may also need to be individually moved. The process of modifying 2D drawing objects in a network is both time consuming and error-prone.

Some CAD applications are available that provide users with a predefined catalog of network parts used to compose a CAD model of a utility network. Such a parts catalog typically includes parts that represent elements of real-world utility networks. For example, a parts catalog may include parts such as pipes, structures, and fittings. Additionally, each part may be associated with a set of attributes. For example, the catalog may specify a variety of pipe parts, each representing a pipe with a different radius (e.g., 2" pipe, 4" pipe, etc.). Such a catalog provides a convenient method for users to compose a CAD model. However, once an instance of a part is included in a particular CAD model, changing the properties for that part may be difficult. For example, to change from a 2" pipe to a 4" pipe may require the user to delete the affected parts from the CAD model and replace them with the desired ones. Further, connections to structures, elevation positions within a digital terrain model, and length attributes may all have to be updated as well. This process can become quite time consuming for a user to make even simple changes to a CAD model. At the same time, these types of changes are frequently required as requirements for a project evolve during a design-build cycle.

Accordingly, there is a need for techniques that allow users to easily edit and modify network parts included in a CAD model of utility network.

SUMMARY OF THE INVENTION

Embodiments of the invention provide a method, an apparatus, and an article of manufacture for editing network part objects (or more simply, just "parts") in a computer aided design (CAD) model of a utility network. The method includes receiving a user selection of a network part on a display of the 3D model. In response, one or more grips associated with the selected network part are enabled. Based on the user input related to editing with the grip, a modified display is provided. One common example of a utility network is a collection of pipes and structures. Grips may be location grips, size grips, or rotation grips.

In one embodiment, the network part is a pipe and the grip is a pipe diameter grip. When the pipe diameter grip is enabled, one or more hash marks corresponding to sizes of the part available in a catalog are displayed. Grip editing input from the user may be restricted to selecting one of the available sizes. After grip editing, a modified display with a pipe having the selected diameter value is provided.

In one embodiment, the network part is a structure and the grip is a structure rotation grip. While the user is editing the grip, the current rotation angle is displayed.

In one embodiment, the network part is a pipe and the grip is a location grip. After grip editing, a modified display includes disconnection from a structure previously connected to the pipe.

In one embodiment, the network part is a pipe and the grip is a location grip. After grip editing, a modified display includes the pipe breaking into an existing pipe or the pipe at a modified location.

In one embodiment, the network part is a structure and the grip is a location grip. After grip editing, connectivity is maintained with one or more pipes previously connected to the structure.

Advantageously, embodiments of the present invention allow users to edit network parts in a CAD model using grips, which simplifies the work required to make modifications to those parts.

BRIEF DESCRIPTION OF THE DRAWINGS

FIG. 9 illustrates the actions of a user interacting with a rotation grip to edit the rotation angle of a structure, according to one embodiment of the invention.

DETAILED DESCRIPTION OF THE PREFERRED EMBODIMENTS

Embodiments of the invention provide a method, an apparatus, and an article of manufacture for editing network part objects present in a computer aided design (CAD) model of a utility network. The network parts are edited with grips. Each part in the CAD model may correspond to a real-world component of a utility network. For example, embodiments of the invention may be used to model a surface water utility network using structure parts such as manholes, catch basins, and storm sewers connected by pipe parts. However, embodiments of the invention are not limited to modeling utility networks of any single type and may be extended to other utility networks. For example, embodiments of the invention described herein may be adapted to model utility networks such as telecommunications networks, pipeline networks, power grid networks, etc.

Figure 4:
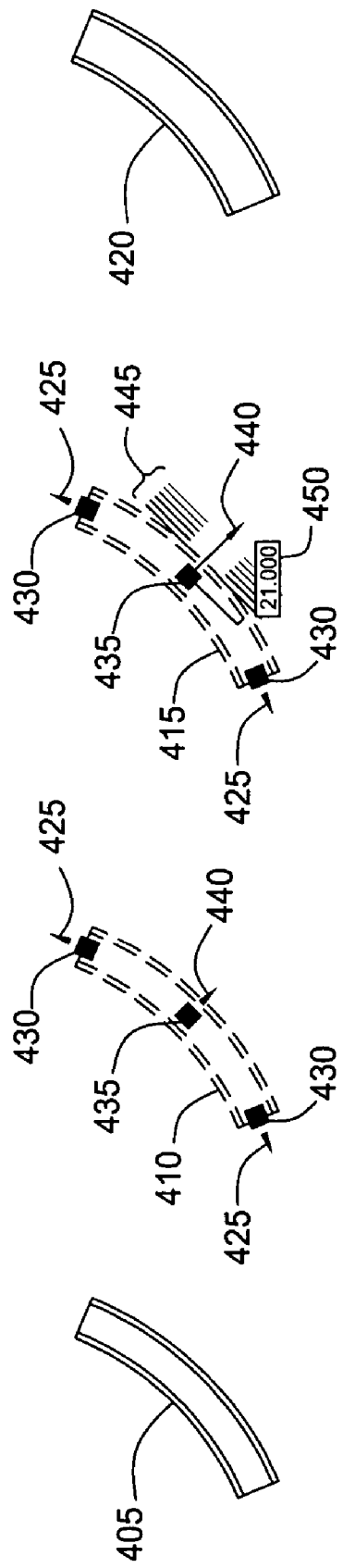
FIGS. 4A-4D illustrate the actions of a user interacting with a resize grip to edit the diameter size of a pipe, according to one embodiment of the invention.

In one embodiment, users of a CAD application may be provided with a catalog of network parts that may be used to compose the CAD model (see, e.g., FIG. 4). The CAD application is configured to allow a user to edit the network parts within the CAD model by resizing, rotating, or making other changes to the network parts. Typically, the network parts represent real-world constructs (e.g., pipes, catch basins, manholes, etc.). Further, two- and three-dimensional graphical views may be generated using a CAD model, such as various, plan, profile and section views. Typically, general editing is performed in plan view and elevation is edited in profile view. While editing functions are illustrated in plan view in FIGS. 4A-4D, 6A, 6B, 7A-7D, 8, and 9 for some embodiments, one of skill in the art will recognize that other embodiments may provide various editing functions in various other views.

When the properties for one part are modified, other parts in the CAD model may be automatically updated. Any part visible from a given view may be selected and modified. When a user modifies a part within one view, other views reflect these modifications. Similarly, attributes and annotations regarding a given part may be modified from a one view, and every view of the model that includes the part may also be updated without requiring any further actions by the user.

Figure 1:
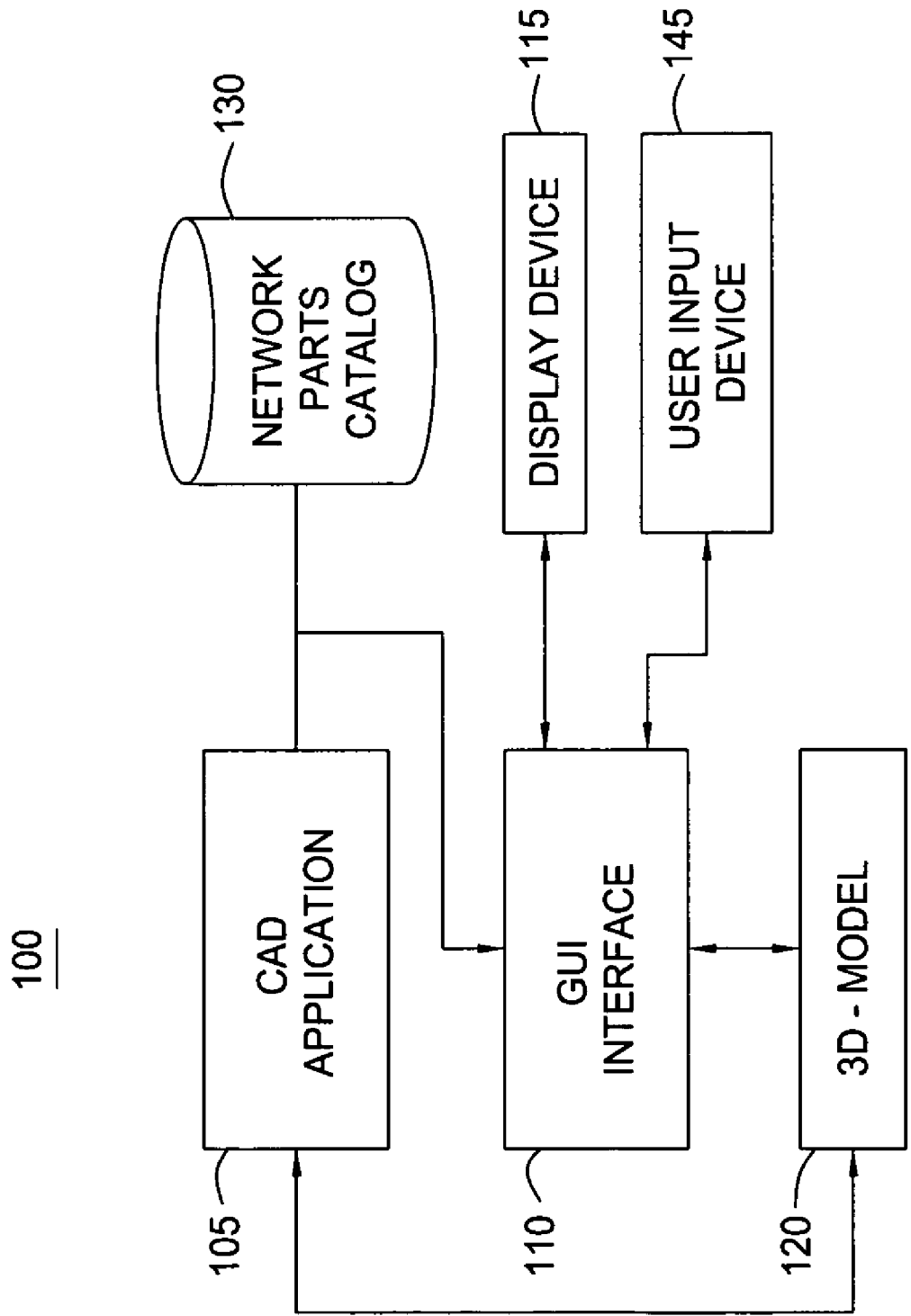
FIG. 1 is a block diagram illustrating a system for composing and editing a CAD model of a utility network, according to one embodiment of the invention.

FIG. 1 is a functional block diagram illustrating an exemplary CAD environment 100 for generating and editing a CAD computer model 120. In one embodiment, the components illustrated in environment 100 include computer software applications executing on existing computer systems, e.g., desktop computers, server computers, laptop computers, tablet computers, and the like. The software applications described herein, however, are not limited to any currently existing computing environment or programming language, and may be adapted to take advantage of new computing systems as they become available.

Additionally, the components illustrated in FIG. 1 may be executing on distributed systems communicating over computer networks including local area networks or large, wide area networks, such as the Internet. For example, a graphical user interface 110 may include a software program executing on a client computer system communicating with a CAD application 105 and a network parts catalog 130 residing on a networked server computer.

As shown, the CAD environment 100 includes, without limitation, CAD application program 105, graphical user interface 110, CAD model 120, user input devices 145, display device 115, and network parts catalog 130.

In one embodiment, the CAD application 105 is a computer program configured to allow a user interacting with GUI interface 110 to generate a CAD model 120. Preferably, the Civil 3D® application program and associated utilities available from Autodesk®, Inc. may be used. CAD application 105 stores the all the data, attributes, properties, and geometry data regarding to the real world structure being modeled in CAD model 120.

The graphical user interface 110 may provide GUI elements that allow a user to select, add, and modify the network parts (and part attributes) included in the CAD model 120. As a user specifies the characteristics of the utility network being modeled, display device 115 provides a visual representation of the CAD model 120. The data for the CAD model 120 may be used as to generate the various 3D renderings and 2D views or graphical representations of the CAD model 120, as well as to generate 2D engineering and construction documentation from the CAD model 120. Although distinct from one another, each view (e.g., profile, plan or a cross-section view) is generated from a common set of network parts data, thus any changes to the network parts data may be reflected in each of the various views that may be generated. Input devices 145 allow a user to interact with the 3D model 120 and GUI interface 110. Typically, user input devices 145 include a mouse pointing device and a keyboard, and display device 115 is a CRT monitor or LCD display.

The network parts catalog 130 provides a collection of parts available for use in composing a CAD model 120. Parts in the catalog may be fixed, single-size parts or part of a parametric part family (e.g., a family of pipes of different sizes and/or materials). Each network part in catalog 130 provides an individual component that may be selected as an entity for inclusion in CAD model 120. Additionally, parts may be defined as a composite of multiple parts and managed as a single entity.

Figure 3:
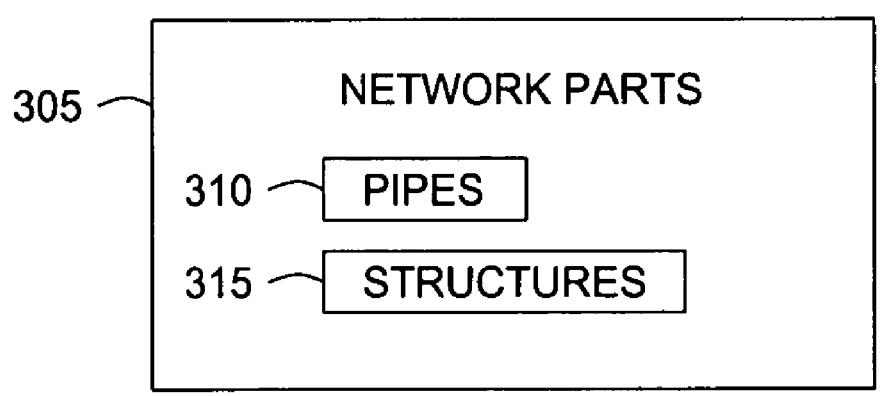
FIG. 3 is a block diagram illustrating two kinds of network parts in a CAD model of a utility network, according to one embodiment of the invention.
Figure 5:
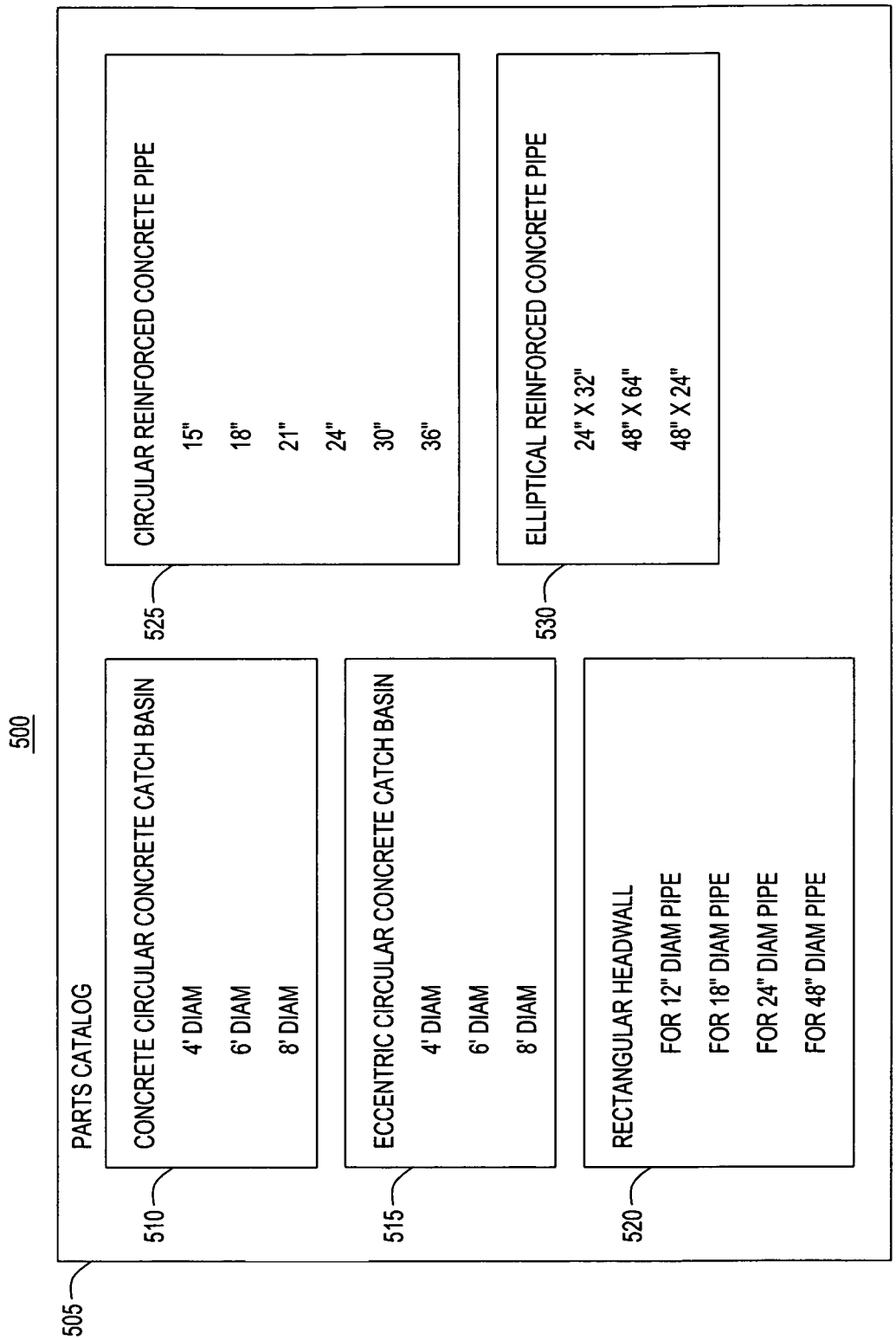
FIG. 5 is a block diagram illustrating an exemplary parts catalog, according to one embodiment of the invention.

In one embodiment, the parts catalog 130 may include network parts representing the pipes, structures, and fittings of a surface-water utility network (see, e.g., FIGS. 3 and 5). In one embodiment, the CAD application 105 generates a display representation of a pipe by sweeping a cross-sectional shape of the pipe along its longitudinal geometry, which may be a line for a straight pipe, or a more complex curve. The parts catalog 130 may include pipes with a variety of cross-sectional shapes such as: circular pipes, elliptical pipes, rectangular pipes, egg-shaped pipes, etc. Pipes may be used to connect network parts representing structures. A structure is a network part serving a specific engineering function in the utility network. For example, in a surface-water utility network, parts may include structures representing manholes, catch basins, headwalls, flared end sections, etc. The display representation for a structure may be provided by the parts catalog, and may include both 2D and 3D display representations. Fittings and junctions are network parts used to branch pipe flow or alter flow direction, and examples include elbow, Wye, tee, cross, etc. To model other utility networks, a different parts catalog may be provided.

In one embodiment, the CAD model 120 may include one or more utility networks. In turn, each utility network may be constructed using a collection of network pars from the catalog 130. Further, a given network part may itself comprise a composite of two or more network parts that may be manipulated by a user as a single entity.

In one embodiment, the GUI interface 110 includes grips that allow the user to easily manipulate and edit network parts present in the CAD model 120. As used herein, a grip is a graphical object that is part of the GUI interface 110 and displayed to the user on the display device 115. One or more grips may be associated with each network part in the CAD model 120. When the user selects a particular network part (e.g., by clicking on a particular part using a mouse cursor), the grips associated with that network part are enabled (i.e., ready for editing) and displayed to the user. Thereafter, the user may edit the selected network part by clicking on one of the grips, dragging the grip by moving the position of the mouse cursor, and releasing the grip at a desired position. In response, the CAD application 105 interprets the movement to modify aspects of the network part in the CAD model 120.

Figure 2:
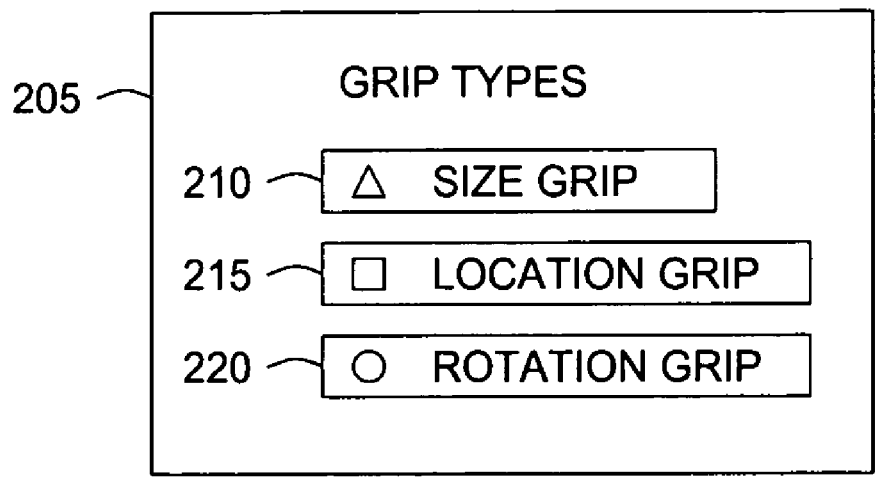
FIG. 2 is a block diagram illustrating some exemplary grip types, according to one embodiment of the invention.

FIG. 2 is a block diagram 200 illustrating some exemplary grip types 205, according to one embodiment of the invention. As shown, there are three types of grips 205: size grips 210, location grips 215, and rotation grips 220. A size grip 210 is graphically indicated by a triangle shape (see, e.g., pipe diameter grip 440 in FIG. 4). A location grip 215 is indicated by a square shape (see, e.g., midpoint grip 615 in FIG. 6A). A rotation grip 220 is indicated by a circle shape (see, e.g., rotation grip 725 in FIG. 7). These grip types 205 may be used for any network part. Other embodiments may include additional types of grips, such as grips to edit various properties or attributes of various parts, Cartesian grips, polar grips, mirror grips, and alignment grips. However denominated, the grips 205 allow users to easily edit aspects of a network part in a 3D model.

FIG. 3 is a block diagram 300 illustrating two kinds of network parts 305 in a CAD model of a utility network, according to one embodiment of the invention. Embodiments of the invention are described herein elements of a CAD model of a surface-water utility network composed from a collection of pipes 315 and structures 305 that may be displayed in plan, profile, or other views. Some examples of pipes 310 and structures 315 are listed in FIG. 5. FIGS. 4A-4D, 6A, 6B, 7A-7D, 8, and 9 illustrate various grips for editing network parts 305.

FIGS. 4A-4D illustrate the actions of a user interacting with a resize grip 440 to edit the diameter size of a curved pipe 405, according to one embodiment of the invention. The curved pipe 405 in FIG. 4A is displayed in plan view. Once the user selects the curved pipe 410, as shown in FIG. 4B, a series of grips on the curved pipe 410 are displayed and enabled. The size of the curved pipe 415 is changed in FIG. 4C using the resize grip 440, resulting in the resized pipe 420 in FIG. 4D.

Six grips are displayed on the curved pipe 410 illustrated in FIG. 4B: two endpoint length grips 425, two endpoint location grips 430, one midpoint location grip 435, and one midpoint resize grip 440. An endpoint length grip 425 may be used to edit the length of the pipe 410. The length of the pipe 410 can be made longer or shorter by using one of endpoint length grips 425. In one embodiment, the endpoint gripped by the user is made longer or shorter along a path beginning from selected endpoint grip 425 without otherwise changing the direction or orientation of the pipe. An endpoint location grip 430 may be used to move the selected endpoint of the pipe 410 to a new point specified by the user. The midpoint and other endpoint of the pipe remain unchanged during the edit with the endpoint location grips 430. The midpoint location grip 435 may be used to move a point specifying an arc through which the midpoint and endpoints pass. That is, the amount of "bulge" in the pipe 410 may be edited using midpoint location grip 435.

FIG. 4C shows the pipe diameter grip 440 being used to resize the curved pipe 415, according to one embodiment of the invention. In this example, the pipe diameter grip 440 is used to resize the curved pipe 415 based on network parts available in the parts catalog 130 (see, e.g., FIG. 5). When the user selects the pipe diameter grip 440, hash marks 445 (or graduated scale) may be displayed. Each hash mark represents the diameter of a pipe part available from the parts catalog 130. In one embodiment, the pipe diameter grip 440 may be configured to snap from one hash mark to the next. In other words, rather than move using a continuous motion, the pipe diameter grip 440 may jump from one available pipe size to the next. This restricts the user to editing the size of the pipe 415 using only pipe parts that are included in the parts catalog 130. In addition, fittings or connection parts used to connect the pipe part 420 to a structure of a utility network may also be updated to reflect the size of pipe part 420.

Additionally, as the pipe diameter grip 440 is dragged over the hash marks 440, the diameter value that would result if the grip were released (or clicked again) may be displayed using tool-tip 450. Once the pipe diameter grip 440 is released, the resize curved pipe 420 is displayed and the CAD model 120 may be updated to reflect the new pipe size. For example, FIG. 4D shows pipe 420 after the user has interacted with pipe diameter grip 440 to increase the size of pipe 410, according to one embodiment of the invention.

Importantly, part diameter grips 440 are not limited to the curved pipes as shown in FIGS. 4A-4D, and similar resizing grips may be provided for a variety of utility network parts. For example, FIG. 7 shows an example of a structure being edited using a network part resize grip. Further, in one embodiment, if two available parts have the same dimension, the first one in the catalog may be chosen when that part is resized using a part resize grip. Alternatively, the user may be prompted to select from one of the available parts. Resize grips allow the user to easily edit the size of a network part object using a series of specific values, which correspond to parts in the parts catalog 130.

FIG. 5 is a block diagram 500 illustrating an exemplary parts catalog 505, according to one embodiment of the invention. As shown, parts catalog 505 includes exemplary structures 510, 515, 520 and pipes 525, 530. For example, concrete circular concrete catch basins are available with diameters of 4', 6' and 8'. Thus, when a circular concrete catch basin is included in the CAD model 120, a resize grip may be used to modify the size of the catch basin to one of the three sizes provided by the parts catalog 130.

Figure 6A:
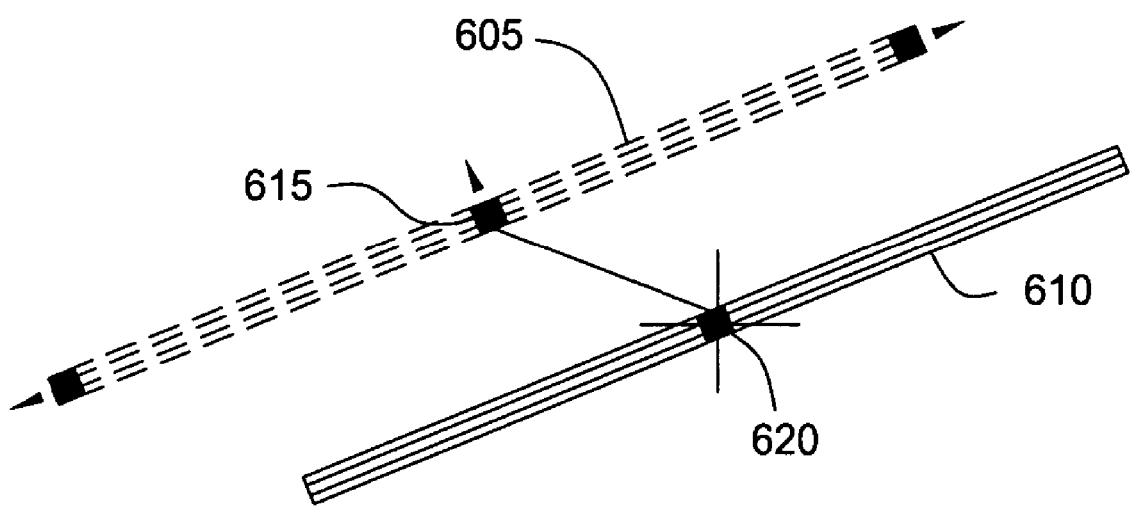
FIG. 6A illustrates the actions of a user interacting with a location grip to edit the location of a pipe, according to one embodiment of the invention.

FIG. 6A illustrates the actions of a user interacting with a location grip 615 to edit the location of a pipe 605, according to one embodiment of the invention. As shown, selected straight pipe 605 is in the process of being relocated to a new position at point 620. Upon completing the move, the midpoint of the pipe 610 is located at point 620. This relocation is performed by selecting location grip 615 and dragging it to point 620.

Figure 6B:
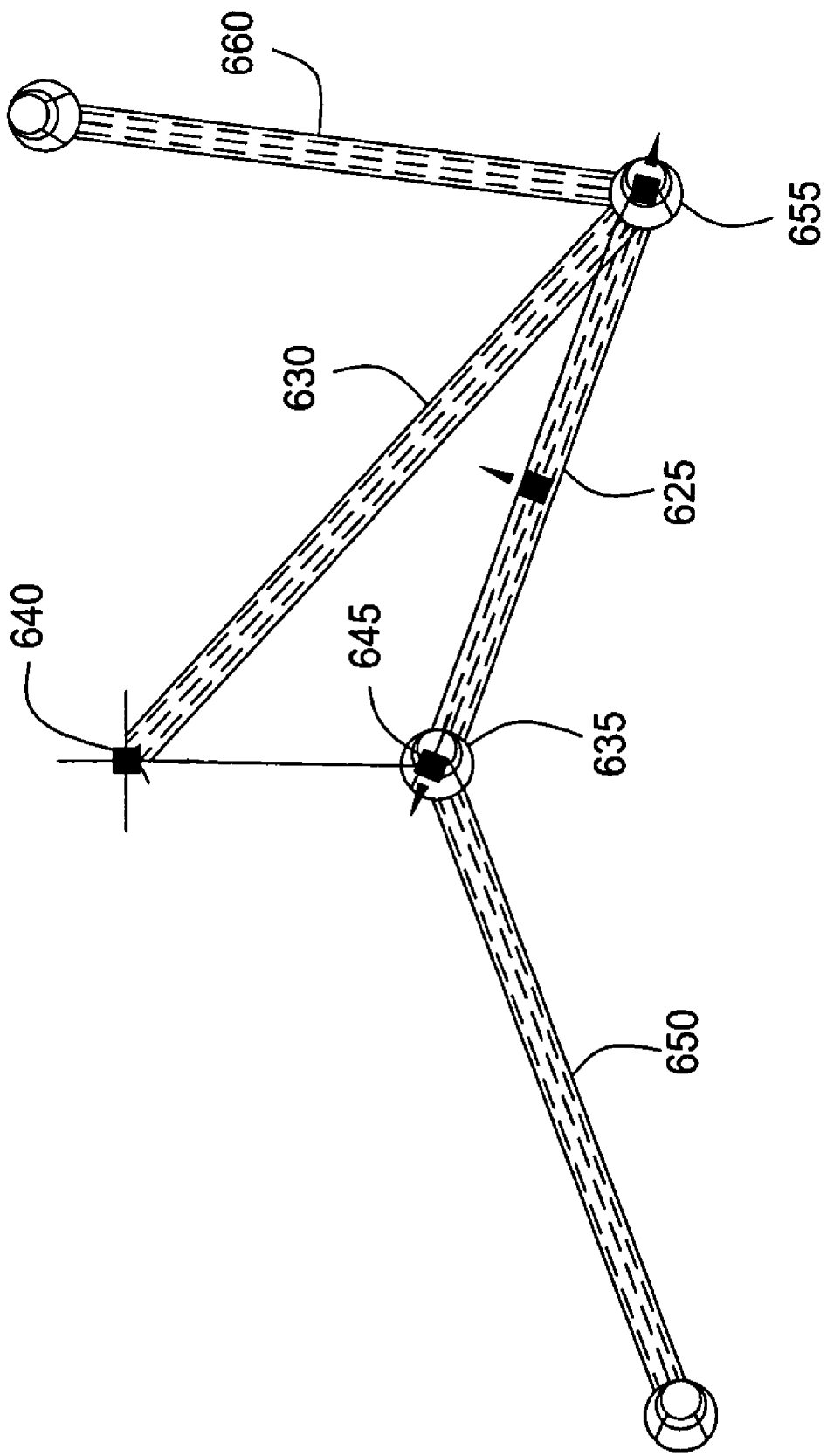
FIG. 6B illustrates the actions of a user interacting with an endpoint grip to edit the location of a pipe endpoint that is connected to other network parts, according to one embodiment of the invention.

FIG. 6B illustrates the actions of a user interacting with an endpoint grip 635 to edit the location of a pipe 650 that is connected to other network parts, according to one embodiment of the invention. As shown, FIG. 6B provides a plan view of a pipe network that includes four structures connected by pipes 625, 650, and 660. Typically, when an endpoint grip is used to move the endpoint of a pipe, the connectivity to any structures that the pipe is connected is lost, unless the pipe endpoint is gripped and moved to a location within the structure to which it was already attached. In other words, grip editing the endpoint of a pipe that is attached to a structure will not move the structure along with it. At the same time, if the endpoint of a pipe is moved to a location of an existing structure in the CAD model 120, a new connection between that structure and the pipe endpoint may be generated. If the other endpoint of the pipe is connected to a structure in the CAD model 120, then that connection may be preserved. For example, structure 655 is shown as connected to pipe 625 before the grip editing, and remains connected to pipe 630 after the grip edit illustrated in FIG. 6B.

In one embodiment, when grip editing a pipe endpoint in a plan view, the elevation of the end of the pipe is maintained. When the pipe is grip edited and connected to a new structure, however, the elevation of the pipe endpoint may be updated to reflect the connection to that structure. Similarly, when the endpoint of a pipe is grip edited and moved over an existing pipe, it will "break" into the existing pipe and the end of the pipe being edited will move to the elevation of the pipe being broken.

In FIG. 6B, the endpoint grip 635 of the selected straight pipe 625 is shown being dragged to a new location at point 640. The resulting relocated straight pipe 630 is disconnected from the structure 645. However, pipe 650 remains connected to the structure 645 and the other end of the selected straight pipe 625 remains connected to structure 655, which is connected to pipe 660. To maintain this connection, the CAD application 105 may update pipe 630 with a new endpoint at location 630, as well as update the length of the pipe 630 based on the point 640 and the location of the structure 655.

Figures 7A, 7B, 7C, 7D:
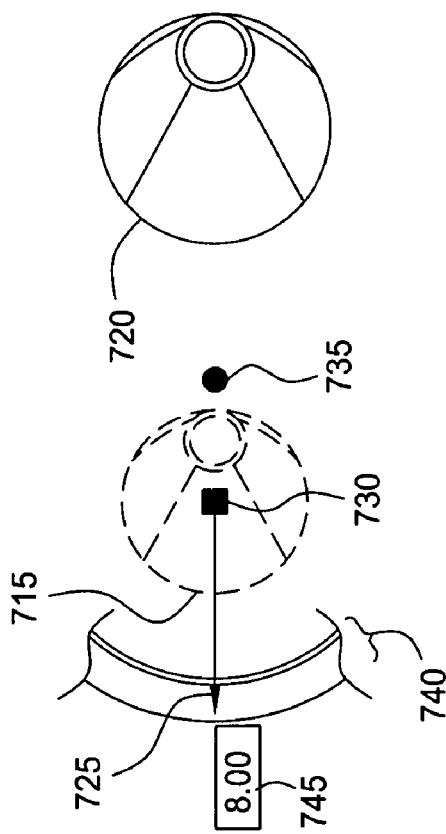
FIG. 7 illustrates the actions of a user interacting with a resize grip to edit the size of a structure, according to one embodiment of the invention.

FIG. 7 illustrates the actions of a user interacting with a resize grip 725 to edit the size of a structure, according to one embodiment of the invention. As shown, an eccentric manhole structure 705 may be selected to enable grips 725, 730, and 735 and resized, resulting in resized structure 720. In FIG. 7B, the selected structure 710 is shown with the following enabled grips: a resize grip 725, a location grip 730, and a rotation grip 735. A user clicks on the resize grip 725 and drags it, as shown in FIG. 7C. Hash marks 740 show the available diameters for the manhole structure 705 in the parts catalog 130, and the size currently dragged to is displayed using tool-tip 745. When the user releases the resize grip 725 (or clicks again), the diameter of the resized structure 720 is set to the nearest available diameter. Alternatively, the resize grip 735 may be configured to jump from one available part size to the next by skipping from one of the hash marks 740 to the next.

Figure 8:
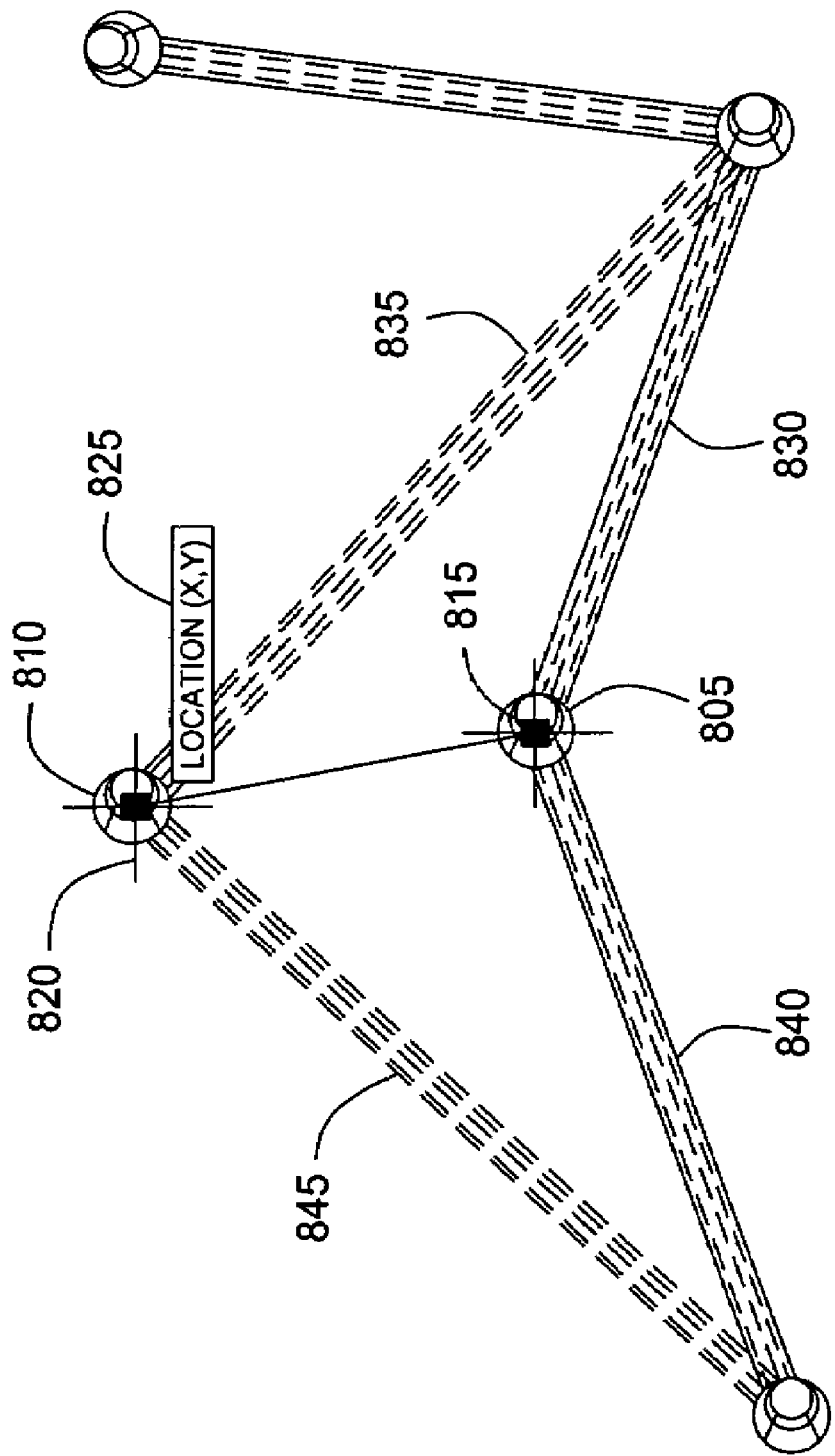
FIG. 8 illustrates the actions of a user interacting with a location grip to edit the location of a structure that is connected to two pipe parts, according to one embodiment of the invention.

FIG. 8 illustrates the actions of a user interacting with a location grip 815 to edit the location of a structure 805 that is connected to two pipe parts, according to one embodiment of the invention. In general, when the location of the structure 805 is edited using the location grip 815, all of the pipe ends connected to it will move along with the structure 805. The elevations of the original pipe ends connected to the structure may also be maintained. As shown, the structure 805 is being relocated to a new point 820 by using location grip 815, resulting in relocated structure 810. While being grip edited, tool-tip 825 may display the X-Y grid coordinates of the current location of the location grip 815. At the same time, pipes 830 and 840 connected to the structure 805 are relocated to pipes 845 and 835 to maintain connectivity as the structure is relocated (from 805 to 810). To maintain the connectivity of pipes 830 and 840, the CAD application 105 may update pipes 830 and 840 with the new endpoint at point 820, as well as update the length of the pipe to reflect the updated pipes 835 and 845 based on the location of the structure 810.

FIG. 9 illustrates the actions of a user interacting with a rotation grip 735 to edit the rotation of a structure 905, according to one embodiment of the invention. Generally, some structures of a utility network may be asymmetric along one or more axes. In such cases, a rotation grip may be used to rotate such a structure. For example, in composing a CAD model of a catch basin along the curb of a road, the grate of the catch basin is typically aligned with the curb. In some cases, the structure is not symmetrical along the vertical axis. It is sometimes desirable to have it aligned to a curb or some other feature. FIG. 9A shows the structure 905 before rotation; FIG. 9B shows the selected structure 910 with grips enabled; FIG. 9C shows the rotating of the structure 915; and FIG. 9D shows the rotated structure 920.

FIG. 9B shows a rotation grip 735 offset from the center of the selected structure 910. When the user selects the rotation grip 735, it can be dragged along the circumference of a fixed circle centered at the insert point (i.e., the position of the vertical axis point 730). As shown in FIG. 9C, the rotation angle 925 is displayed as the rotation grip 735 is being dragged. Clicking again (or releasing) transforms the structure to the new rotation angle. The rotation grip 735 allows the user to spin the structure around to get the desired orientation. The new value of the rotation angle property is stored after grip editing.

In one embodiment of the invention, a computer-readable medium containing a program which when executed by a processor, performs operations for editing a computer aided design (CAD) model of a utility network, including the steps of receiving a user selection of a network part on a display of the CAD model, enabling at least one grip associated with the selected network part, receiving a grip editing input from the user, displaying a modified display based on the grip editing input, and updating the CAD model based on the grip editing input.

We claim:

1. A method for editing a computer aided design (CAD) model of a utility network, the method comprising:
   receiving a user selection of a network part associated with the CAD model;
   enabling at least one grip associated with the selected network part;
   in response to enabling the at least one grip, displaying on a display device one or more hash marks corresponding to one or more sizes of the selected network part available in a catalog of network parts stored in a memory;
   receiving a first grip editing input from the user, wherein the first grip editing input is restricted to selecting one of the one or more sizes of the selected network part available in the catalog of network parts by choosing a hash mark corresponding to one of the one or more sizes;
   updating the selected network part based on the first grip editing input corresponding to the selected size;
   displaying on the display device a modified display of the network to reflect the updated selected network part having the selected size.

2. The method of claim 1, wherein the network part represents one of a structure or a pipe used in the construction of the utility network.

3. The method of claim 1, wherein a first grip is one of a network part location grip, a network part size grip, or a network part rotation grip.

4. The method of claim 1, further comprising the step of updating one or more network parts other than the selected network part based on the first grip editing input.

5. The method of claim 1, wherein the network part is a pipe and a first grip is a pipe diameter grip.

6. The method of claim 5, wherein enabling the pipe diameter grip includes displaying on the display device one or more hash marks corresponding to one or more diameter values available in the catalog of network parts, further wherein a second grip editing input is restricted to selecting one of the available diameter values, and further wherein the modified display includes the pipe having the selected diameter value.

7. The method of claim 1, wherein the network part is a structure and a first grip is a structure rotation grip, and further wherein a current rotation angle is displayed while grip editing input is being received.

8. The method of claim 1, wherein the network part is a pipe and a first grip is a location grip, and further wherein the modified display includes disconnection from a structure previously connected to the pipe.

9. The method of claim 1, wherein the network part is a pipe and a first grip is a location grip, and further wherein the modified display includes the pipe breaking into an existing pipe.

10. The method of claim 1, wherein the network part is a structure and a first grip is a location grip, and further wherein connectivity is maintained with at least one pipe previously connected to the structure.

11. A computer-readable medium containing a program which when executed by a processor, performs operations for editing a computer aided design (CAD) model of a utility network, including the steps of:
    receiving a user selection of a network part associated with the CAD model;
    enabling at least one grip associated with the selected network part;
    in response to enabling the at least one grip, displaying on a display device one or more hash marks corresponding to one or more sizes of the selected network part available in a catalog of network parts stored in a memory:
    receiving a first grip editing input from the user, wherein the first grip editing input is restricted to selecting one of the one or more sizes of the selected network part available in the catalog of network parts by choosing a hash mark corresponding to one of the one or more sizes;
    updating the selected network part based on the first grip editing input corresponding to the selected size;
    displaying on the display device a modified display of the network to reflect the updated selected network part having the selected size.

12. The computer-readable medium of claim 11, wherein the network part represents one of a structure or a pipe used in the construction of the utility network.

13. The computer-readable medium of claim 11, wherein a first grip is one of a network part location grip, a network part size grip, or a network part rotation grip.

14. The computer-readable medium of claim 11, further comprising the step of updating one or more network parts other than the selected network part based on the first grip editing input.

15. The computer-readable medium of claim 11, wherein the network part is a pipe and a first grip is a pipe diameter grip.

16. The computer-readable medium of claim 15, wherein enabling the pipe diameter grip includes displaying on the display device one or more hash marks corresponding to one or more diameter values available in the catalog of network parts, further wherein a second grip editing input is restricted to selecting one of the available diameter values, and further wherein the modified display includes the pipe having the selected diameter value.

17. The computer-readable medium of claim 11, wherein the network part is a structure and a first grip is a structure rotation grip, and further wherein a current rotation angle is displayed while grip editing input is being received.

18. The computer-readable medium of claim 11, wherein the network part is a pipe and a first grip is a location grip, and further wherein the modified display includes disconnection from a structure previously connected to the pipe.

19. The computer-readable medium of claim 11, wherein the network part is a pipe and a first grip is a location grip, and further wherein the modified display includes the pipe breaking into an existing pipe.

20. The computer-readable medium of claim 11, wherein the network part is a structure and a first grip is a location grip, and further wherein connectivity is maintained with at least one pipe previously connected to the structure.

21. A computing device comprising:
    a display device:
    a processor; and
    a memory configured to store an application that includes instructions which, when executed by the processor, cause the processor to perform operations for editing a computer generated computer aided design (CAD) of a real-world utility network, including the steps of:
    receiving a user selection of a network part associated with the CAD model,
    enabling at least one grip associated with the selected network part,
    in response to enabling the at least one grip, displaying on a display device one or more hash marks corresponding to one or more sizes of the selected network part available in a catalog of network parts stored in a memory,
    receiving a first grip editing input from the user, wherein the first grip editing input is restricted to selecting one of the one or more sizes of the selected network part available in the catalog of network parts by choosing a hash mark corresponding to one of the one or more sizes,
    updating the selected network part based on the grip editing input corresponding to the selected size,
    displaying on the display device a modified display of the network to reflect the updated selected network part having the selected size.

22. The computing device of claim 21, wherein the network part represents one of a structure or a pipe used in the construction of the utility network.

23. The computing device of claim 21, wherein a first grip is one of a location grip, a size grip, or a rotation grip.

24. The computing device of claim 21, further comprising the step of updating one or more network parts other than the selected network part based on the first grip editing input.

25. The computing device of claim 21, wherein the network part is a pipe and a first grip is a pipe diameter grip.

26. The computing device of claim 25, wherein enabling the pipe diameter grip includes displaying on the display device one or more hash marks corresponding to one or more diameter values available in the catalog of network parts, further wherein a second grip editing input is restricted to selecting one of the available diameter values, and further wherein the modified display includes the pipe having the selected diameter value.

* * * * *

UNITED STATES PATENT AND TRADEMARK OFFICE
CERTIFICATE OF CORRECTION

| | | |
|---|---|---|
| PATENT NO. | : 7,598,968 B2 | Page 1 of 1 |
| APPLICATION NO. | : 11/390018 | |
| DATED | : October 6, 2009 | |
| INVENTOR(S) | : Connor et al. | |

It is certified that error appears in the above-identified patent and that said Letters Patent is hereby corrected as shown below:

In column 10, line 34, please replace "based on the grip" with -- based on the first grip --.

Signed and Sealed this

Ninth Day of March, 2010

David J. Kappos
*Director of the United States Patent and Trademark Office*